United States Patent
Honig et al.

[15] 3,705,164

[45] Dec. 5, 1972

[54] PROCESS FOR THE PRODUCTION OF MODIFIED ANIONIC EMULSION POLYMERS WITH ANIONIC POLYURETHANE

[72] Inventors: Hans Ludwig Honig, Leverkusen; Gerhard Balle, Cologne-Flittard; Wolfgang Keberle; Dieter Dieterich, both of Leverkusen, all of Germany

[73] Assignee: Farbenfabriken Bayer Aktiengesellschaft, Leverkusen, Germany

[22] Filed: Oct. 21, 1970

[21] Appl. No.: 82,794

[30] Foreign Application Priority Data

Oct. 23, 1969    Germany..........P 19 53 348.3

[52] U.S. Cl. .........260/29.6 NR, 117/161 KP, 260/8, 260/17 R, 260/17.4 R, 260/29.7 R, 260/859 R, 260/859 PV

[51] Int. Cl. .............................................C08f 45/24

[58] Field of Search....260/29.6 NR, 29.40 A, 859 R, 260/859 PV

[56] References Cited

UNITED STATES PATENTS

| | | |
|---|---|---|
| 3,249,654 | 5/1966 | Von Bonin et al.........260/874 |
| 3,388,087 | 6/1968 | Dieterich et al....260/29.2 TN |
| 3,539,483 | 11/1970 | Keberle et al......260/29.6 NR |

*Primary Examiner*—Harold D. Anderson
*Attorney*—Robert A. Gerlach and Sylvia Gosztonyi

[57] ABSTRACT

A process is provided for the production of stable aqueous polymer dispersions by subjecting vinyl monomers to radical emulsion polymerization in the presence of a stable aqueous dispersion of a high molecular weight polyurethane containing anionic groups.

10 Claims, No Drawings

PROCESS FOR THE PRODUCTION OF MODIFIED ANIONIC EMULSION POLYMERS WITH ANIONIC POLYURETHANE

Aqueous emulsions of polyurethanes containing blocks of vinyl polymers can be obtained by copolymerizing vinyl monomers with polyurethanes having terminal vinyl groups in an aqueous emulsifier-containing medium. Unfortunately, this process is complicated in the preparation of the polyurethane since a prepolymer with terminal isocyanate groups is reacted at one end of the chain with a vinyl monomer containing an active hydrogen atom, for example hydroxyethyl acrylate, while chain extension is effected via the second isocyanate group with the result that a polyurethane having two terminal vinyl groups is formed. This polyurethane is dissolved in one or more vinyl monomers and the mixture is radically polymerized in an aqueous medium in the presence of an emulsifier. Since crosslinked polymers are formed in each instance due to the bifunctionality of the divinyl polyurethane, the range of application of such polymers is limited.

It is also known that olefins, olefins with nitrogen-containing groups or vinyl esters can be radically grafted onto polyalkylene glycols either in bulk or in solution when the terminal hydroxyl groups of the glycol have been reacted with diisocyanates as described in German Pat. Nos. 1,077,430 and 1,105,179.

The radical polymerization of vinyl or vinylidene compounds onto polyacetals containing urethane groups is described in U.S. Pat. No. 3,249,654.

Finally, it has also been proposed to employ high molecular weight cationic polyurethanes containing quaternary ammonium or tertiary sulphonium groups as emulsifiers for polymerization reactions as described in U.S. Pat. No. 3,388,087.

It is therefore an object of this invention to provide stable aqueous polymer dispersions and a method for preparing them which are devoid of the foregoing disadvantages.

Another object of this invention is to provide a process for the production of stable aqueous polymer dispersions in the presence of anionic polyurethane particles which serve as a grafting substrate.

A further object of this invention is to provide stable aqueous polymer dispersions and a method for preparing them which does not require the presence of an emulsifier.

A still further object of this invention is to provide stable aqueous polymer dispersions which are eminently suitable as coating compositions of excellent compatibility with pigments for dry as well as for salt containing surfaces, the ultimate hardness and flexibility of which can be easily adjusted if desired.

The foregoing objects and others which will become apparent from the following description are accomplished in accordance with this invention, generally speaking, by providing a process for the production of stable aqueous polymer dispersions which comprises polymerizing about 5 – 95 percent by weight based on the total amount of non-aqueous matter of olefinically unsaturated monomers under radical emulsion polymerization conditions in the presence of about 95 – 5 percent by weight based on the total amount of non-aqueous matter of an anionic polyurethane having a molecular weight of at least 20,000 containing from about 0.1 to about 10 percent by weight of an anionic group which polyurethane is present in the form of a stable aqueous dispersion.

The properties of the polymer can be varied within wide limits to the particular purpose for which they are to be used by a judicious selection of starting materials. Thus, soluble polymers can be obtained by polymerizing vinyl monomers which have no crosslinking effect in an aqueous dispersion of an uncrosslinked anionic polyurethane. The hydrophilic and hydrophobic properties, hardness and flexibility or elasticity of the resulting polymer can be varied by selecting suitable monomers and the anionic polyurethane. Insoluble polymers can be obtained by using crosslinked anionic polyurethanes as starting materials or by using vinyl monomers which have a crosslinking effect during the polymerization reaction. By incorporating reactive vinyl monomers in the vinyl component, it is also possible to obtain initially soluble polymers which can be converted subsequently into a crosslinked, insoluble form through reactive groups by suitable after-treatment.

The process of the invention is carried out under radical emulsion polymerization conditions. This means 1. the polymerization is carried out in an aqueous phase;
2. the polymerization is carried out in the presence of emulsifying agents for the starting material as well as for the end-products which emulsifying agent in the case of the present invention consists either solely of the anionic polyurethane salt or of a combination of the anionic polyurethane salt with an other emulsifying agent;
3. the polymerization is carried out in the presence of radical initiating catalysts at a temperature such to activate these catalysts.

The radical emulsion polymerization is described in detail in "Methoden der Organischen Chemie", Houben-Weyl, volume 14/1, 4th edition, pages 133 – 560.

More particularly, the process can be carried out by stirring an aqueous emulsion of an anionic polyurethane with a radically polymerizable vinyl monomer or monomer mixture and initiating the polymerization reaction under the usual conditions. The vinyl monomers may be added either all at once or initially only in part, the remainder being added during the reaction.

The anionic polyurethane from which the dispersions of this invention are prepared contain from about 0.1 to about 10 percent by weight of a radical selected from the group consisting of

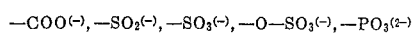
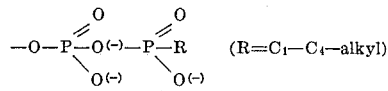

which radical is in the alkali metal salt form or in the form of an ammonium salt and can be obtained by known methods from relatively high molecular weight compounds having reactive hydrogen atoms and molecular weights of from 300 to 20,000, organic polyisocyanates and optionally chain extenders containing reactive hydrogen atoms.

Any of the known and conventionally employed components may be used as the compounds containing reactive hydrogen atoms and having molecular weights of from about 300 to about 20,000, organic polyisocyanates and optionally chain extenders containing reactive hydrogen atoms. Examples of these compounds can be found in Belgian Pat. Nos. 653,223; 669,954; 681,712 and 673,432 and U.S. Pat. Nos. 3,201,372 and 3,350,362.

The quantitative ratios of the polyurethane reactants can be varied within wide limits depending on whether a soft, flexible or elastic, or extremely hard and thermoplastic product is desired. The quantitative ratios of the starting components for the polyurethane dispersions of this invention should be selected in such a way that the polyurethanes formed are plastic in nature; i.e., they should have a tensile strength in excess of 20 kp/cm². As a rule, polyurethanes of this kind have average molecular weights in excess of 20,000 preferably in excess of 100,000 and up to several hundred thousand. In general the preferred polyurethane dispersions having a molecular weight of above 100,000 are gels which do not yield clear solutions e.g. in tetrahydrofurane.

Examples illustrating the preparation of aqueous polyurethane dispersions which can be employed in the practice of this invention can be found in Belgian Pat. Nos. 3,479,310; 3,461,103; U.S. Pat. application Ser. No. 867,931, filed on Oct. 20, 1969, now abandoned; U.S. Pat. No. application Ser. No. 836,210, filed on June 12, 1969; U.S. Pat. application Ser. No. 869,949, filed on Oct. 27, 1969, now abandoned; U.S. Pat. No. 3,522,199; U.S. Pat. No. 3,539,483 and U.S. Pat. application Ser. No. 757,780, filed on Sept. 5, 1968, now abandoned.

Dispersions of polyurethanes containing from about 0.2 to about 10 percent by weight of sulphonate or from about 0.1 to about 5 percent by weight of carboxylate groups as the anionic components are particularly suitable in the practice of this invention, and dispersions containing sulphonate groups are especially preferred.

To prepare dispersions of polyurethanes containing anionic groups, a preadduct containing isocyanate groups is generally reacted in an organic solution with an anionic component. Water is then added and the organic solvent is distilled off. However, it is also possible to adopt the reverse procedure and initially add the water containing the anionic component, followed by introduction of the preadduct containing isocyanate groups. Examples of anionic components suitable for incorporation include the alkali metal salts of amino acids such as taurine, methyl taurine, 6-amino caproic acid, glycine, sulphanilic acid, diamino benzoic acid, ornithine, lysine and 1:1 adducts of sultones, such as propane sultone or butane sultone, with diamines, such as ethylene diamine, hydrazine or 1,6-hexamethylene diamine.

Of course the invention is not limited to polyurethanes which contain the ionic groups in the form of ionic chain lengthening agents. It is e.g. also possible to modify an original nonionic polyurethane after its build up by reaction with for instance thioglycolic acid, sodium bisulfite, propane sultone and the like in order to incorporate the anionic groups in the polyurethane chain.

In principle, any radically polymerizable olefinically unsaturated compounds and mixtures thereof may be used as the monomers in the practice of this invention including any of those listed in U.S. Pat. No. 3,225,119. Some examples of suitable compounds include:

1. Ester of a,b-unsaturated carboxylic acids such as, for example, methyl methacrylate, ethyl acrylate, butyl acrylate, stearyl methacrylate, hydroxypropyl acrylate, 2-aminoethyl methacrylate hydrochloride, dimethylaminoethyl methacrylate, methoxymethyl methacrylate, chloromethyl methacrylate, dichlorotriazinyl-aminoethyl methacrylate, esters of maleic acid, fumaric acid or itaconic acid and the like;
2. a,b-unsaturated carboxylic acids such as, for example, acrylic acid, methacrylic acid, maleic acid and the like;
3. Amides of a,b-unsaturated carboxylic acids such as, for example, acrylamide, methacrylamide, maleic acid amide, maleic acid imide and the like;
4. Substituted amides of unsaturated carboxylic acids such as, for example, methylol methacrylamide, methoxymethyl acrylamide, N-(methylacrylamidomethyl)-urethane, N-(chloroacetamidomethyl)-acrylamide and the like;
5. Nitriles of a,b-unsaturated carboxylic acids such as, for example, acrylonitrile, methacrylonitrile and the like;
6. Vinyl esters such as, for example, vinyl acetate, vinyl chloroacetate, vinyl chloride and the like;
7. Vinyl ethers such as, for example, vinyl ethyl ether and the like;
8. Vinyl ketones such as, for example, vinyl methyl ketone and the like;
9. Vinyl amides such as, for example, vinyl formamide, vinyl acetamide and the like;
10. Aromatic vinyl compounds such as, for example, styrene, vinyl toluene and the like;
11. Heterocyclic vinyl compounds such as, for example, vinyl pyridine, vinyl pyrrolidone and the like;
12. Vinylidene compounds such as, for example, vinylidene chloride and the like;
13. Divinyl compounds such as, for example, divinyl benzene, butane diol dimethacrylate and the like;
14. Monoolefins such as, for example, ethylene, propylene and the like;
15. Conjugated diolefins such as, for example, butadiene, isoprene, 2-chlorobutadiene and the like;
16. Allyl compounds such as, for example, allyl acetate, allyl alcohol and the like.

Any suitable polymerization catalysts may be used including inorganic peroxidic compounds such as potassium or ammonium persulphate, hydrogen peroxide or percarbonates; organic peroxidic compounds, such as acyl peroxides including, for example, benzoyl peroxide, alkyl hydroperoxides, such as tert-butyl hydroperoxide, cumene hydroperoxide and p-menthane hydroperoxide; dialkyl peroxides such as di-tert-butyl peroxide; peroxy esters such as tert-butyl perbenzoate and the like and mixtures thereof. The inorganic peroxidic compounds are advantageously used in combination with any suitable reducing agents known per se including sodium pyrosulphite or bisulphite, sodium formaldehyde sulphoxylate, triethanolamine, tetraethylene pentamine and the like. Also azo compounds such as azoisobutyronitril, azoisobutyric acid ethylester, azoisobutyroamidine, 4,4'-azo- 4-cyano-valerianic acid and the like are particularly suitable. The initiators which decompose into radicals may be used alone or in combination with reducing agents or heavy metal compounds. Sodium pyrosulphite, potassium pyrosulphite, formic acid, ascorbic acid, hydrazine derivatives, amine derivatives and rongalite are examples of reducing agents. The heavy metal compounds may be present either in an oil soluble or in a water soluble form. Water soluble heavy metal compounds include for example silver nitrate, halides or sulphates of divalent or trivalent iron, cobalt or nickel or salts of titanium or vanadium of lower valences state. Examples of oil soluble heavy metal compounds are cobaltnaphthenate and the acetyl acetone complexes of vanadium, cobalt, titanium, nickel or iron. Preferred initiator systems are combinations of oxidizing agents with reducing agents such as combinations of above peroxides or inorganic oxidizing agents such as metal chlorates, metal chlorides or metal hypochlorites with reducing agents such as hydrazine, hydroxyl amine and especially compounds of the divalent or tetravalent sulfur such as metal sulphites, metal sulphides, metal thiosulphates and especially sulphinates such as sodium hydroxymethyl sulphinate.

The catalysts are employed in the catalytic quantities normally used to initiate polymerization reactions of this kind, i.e. in quantities of from about 0.01 to about 5 percent by weight preferably 0.02 to 1 percent by weight, based on the total weight of the monomer.

The usual regulators such as long-chain alkyl mercaptans, diisopropyl xanthogenate, nitro compounds or organic halogen compounds, may also be used during polymerization to influence molecular weight. The regulator may optionally be used in amounts of from 0.05 to 5 percent by weight based on the monomers. Typical examples are nitro compounds such as β-nitrostyrene, p-nitroaniline, benzal-p-nitraniline, halogen containing compounds such as tetraiodomethane, iodoform, benzyliodide, allyliodide, N-chlorophthalimide, tribromomethane, 1,1,1-tribromo-2-methyl-propanol-2, mecaptanes such as n-dodezylmercaptane, tetradecylmercaptane, diisopropylxantogendisulphide etc.

The polymerization temperatures are governed both by the type of monomer used and the activation system employed, but generally range from about 0° to about 150°C., and preferably from about 30° to about 100° C.

Anionic emulsifiers or non-ionic emulsifiers or amphoteric emulsifiers or combinations thereof may be used as emulsifiers including anionic emulsifiers such as, for example, the alkali and ammonium salts of higher fatty acids, resin acids, acidic fatty alcohol sulphuric acid ester, higher alkyl sulphonates and alkyl aryl sulphonates, sulphonated castor oil, sulphosuccinic acid esters, or the water-soluble salts of sulphonated ethylene oxide adducts. The known products of the reaction between ethylene oxide and long-chain fatty alcohols or phenols may be used as non-ionic emulsifiers and the reaction products of more than 10 mols of ethylene oxide with 1 mol of fatty alcohol or phenol are particularly suitable. A total quantity of up to about 20 percent by weight of the emulsifiers based on the total monomer component may be used but preferably from about 2 to about 10 percent by weight is employed. Examples of suitable anionic, nonionic and amphoteric emulsifiers are listed in Mark, Craylord, Bikales: Encyclopedia of Polymer Science and Technology, Interscience Publishers Vol. 5, pages 816 – 818; Kirk-Othmer: Encyclopedia of Chemical Technology, $2^{nd}$ edition, Vol. 8, pages 127 – 130 (Types A and N). Further the following patents list up emulsifiers of the anionic, amphoteric or nonionic type which are suitable in the present invention: U.S. Pat. No. 3,298,986; 3,347,811; 3,380,927; 3,373,173; 3,322,568; 3,178,310.

In addition to the aforementioned emulsifiers, known protective colloids such as polyvinyl alcohol and polyvinyl pyrrolidone, polyacrylamides or water-soluble copolymers with a predominating acrylamide component, salts of polyacrylic acids, condensation products of formaldehyde with naphthalene sulphonic acids, casein, tragacanth, alginic acids, methoxy-or carboxy-cellulose, or even inorganic compounds such as magnesium hydroxide, finely divided barium sulphate or finely divided silica may also be added at any time. The anionic polyurethanes and the monomers to be polymerized may be present in any ratios in the reaction mixture although it is preferred to employ from about 5 to about 95 percent by weight of anionic polyurethanes to from about 95 to about 5 percent by weight of the monomers. The polyurethanes are used in the form of their aqueous dispersions and usually have solids contents of from about 5 percent to about 60 percent by weight.

The emulsion polymerization reaction may also be carried out in the absence of emulsifiers, the anionic polyurethane serving both as emulsifier and as a graft base. In this embodiment, it is preferred to employ at least about 20 percent of the anionic polyurethane and up to about 80 percent by weight of polymerizable monomers. High molecular weight polyurethanes with good emulsifying properties preferably contain 1–1–10 percent of sulphonate groups.

In many instances, the polymers initially introduced and the polymers grafted thereto undergo chemical reaction in which the degree of grafting is governed by the type of monomers used, the catalysts employed and the polymerization conditions utilized.

In polyurethane dispersions prepared without emulsifiers and without any grafted vinyl components, salt groups take over the function of the emulsifier. These dispersions are distinguished by many interesting service properties including the fact that they can be processed into films of outstanding mechanical strength. Unfortunately, a serious disadvantage of these dispersions is the fact that the salt groups incorporated therein render the polyurethane hydrophilic to a limited extent so that the films prepared therefrom swell in water. By contrast, the films obtained from the vinyl polymer-polyurethane dispersions of this invention have a markedly reduced tendency to swell in water.

The polyurethane dispersions of this invention may be used as coating compositions, the ultimate hardness and flexibility of which can be adjusted as required by a judicious selection of the starting components.

In the area of coatings, paints, pigment binders, printing pastes, finishing agents and the like the products of the invention are particularly useful because of their excellent stability towards mechanical sharing forces as well as chemical influences, e.g. of electrolytes. A special useful property is their stability towards a variety of pigments. Especially the dispersion types with sulphonate groups may be pigmented with up to about 600 parts of pigments based on 100 parts of the vinylmodified polyurethane. Pigmentation may be very simply performed, e.g. by adding the dry pigment to the dispersion while stirring. This is impossible with most cationic dispersions.

The invention is further illustrated but is not intended to be limited by the following examples in which all parts and percentages are by weight unless otherwise specified.

The following polyurethane dispersions, for example, may be used in the process of this invention.

Polyurethane Dispersion I

A preadduct obtained from about 218.5 parts of an adipic acid-hexane diol-neopentyl glycol polyester (OH number 63) and about 55 parts of 1,6-hexane diisocyanate by reaction for about two hours at about 120°C., is taken up in about 800 ml of acetone (0.18 percent water content), followed by the addition at about 55°C. of a mixture of about 7.5 parts of ethylene diamine, about 15 parts of 1,3-propane sultone and about 70 ml of about a 10 percent aqueous potassium hydroxide solution in about 50 ml of water. Following the addition of about 480 ml of water, the acetone is distilled off in vacuo. About a 39 percent stable dispersion having a pH of from 6 to 7 is obtained. When the dispersion is dried, a clear, elastic plastic film is obtained.

A film obtained from the anionic polyurethane has a tensile strength of from about 80 to 120 kp/cm².

Polyurethane Dispersion II

About 250 parts of a polypropylene glycol ether (OH number 56) are reacted for about 2 hours at about 80°C. with about 126 parts of tolylene diisocyanate (2,4/2,6-isomer ratio 65:35). After cooling to about 70°C., about 52 parts of neopentyl glycol in about 100 ml of acetone are added to the reaction mixture, which is then maintained at about 60°C. for about 5 hours. About 800 ml of acetone are then added. After the addition of a mixture of about 50 ml of water, about 4 parts of ethylene diamine, about 8 parts of 1,3-propane sultone, about 25 ml of about a 10 percent sodium hydroxide solution and about 450 ml of water are stirred in. After the acetone has been distilled off, a stable dispersion having a solids content of about 47 percent is obtained.

A hard, flexible, coherent film is obtained when the dispersion is dried.

A film obtained from the anionic polyurethane has a tensile strength of approximately 290 kp/cm².

EXAMPLE 1

About 50 parts of Polyurethane Dispersion I having a solids content of about 40 percent and about 100 ml of water are introduced into a vessel equipped with stirring mechanism and having a capacity of about 200 ml and heated to about 45°C. while flushing with nitrogen. About 10 parts of butyl acrylate are then emulsified in the dispersion and a solution of about 0.1 part of sodium formaldehyde sulphoxylate in about 10 ml of water and about 0.3 ml of about a 70 percent cumene hydroperoxide solution are added. The beginning of polymerization is signaled by a rise in temperature of several degrees. Another about 30 parts of butyl acrylate are then added dropwise over a period of about 1 hour. After another about 2 hours, a stable emulsion having a solids content of about 30 percent is obtained. Highly elastic clear films are obtained by pouring the emulsion onto glass plates. Extraction of an air dried film with toluene gives 18.4 percent of extract after 24 hours. Since polyurethane I is crosslinked and only contains approximately 4 percent of extractable components, this means that 21.4 percent of the butyl acrylate used is present in the form of a homopolymer, while about 78.6 percent of the monomer has formed a graft copolymer with the polyurethane.

When stored for about 24 hours in water, the films undergo an increase in weight of about 13.4 percent of their dry weight. A film obtained from polyurethane I undergoes an increase in weight of about 51.5 percent of its dry weight under similar conditions.

EXAMPLE 2

About 75 parts of the 40 percent Polyurethane Dispersion I are diluted with about 70 ml of water and, following the addition of about 15 parts of ethyl acrylate, solutions of about 0.3 part of potassium sulphate in about 25 ml of water and about 0.1 part of sodium pyrosulphite in about 10 ml of water are introduced while stirring in a nitrogen atmosphere at about 50°C. The temperature rises spontaneously by several degrees. After the reaction has abated, about 55 parts of ethyl acrylate are added dropwise over a period of about 1 hour. The reaction mixture is then stirred for another hour at about 50°C. The finely divided emulsion obtained has a solids content of about 40 percent. When the emulsion is dried on a glass plate, a clear highly elastic film is formed which contains about 21.7 percent of components that can be extracted with toluene. This means that 69 percent of the ethyl acrylate used is linked chemically with the crosslinked polyurethane.

When stored in water, the air dried film increases in weight by only about 18 percent of its original weight over a period of 24 hours.

EXAMPLE 3

A mixture of about 100 parts of Polyurethane Dispersion II and about 120 ml of water is heated to about 40°C. following which about 20 parts of butyl acrylate are added. Polymerization begins after about 0.1 part of sodium pyrosulphite, about 0.4 part of potassium persulphate and about 0.5 ml of a 1 percent FeSO₄ solution are added. Another about 60 parts of butyl acrylate are added dropwise over a period of about 1 hour. On completion of the addition, the mixture is stirred for about another 4 hours at about 40°C., after which the latex has a solids content of about 40 percent. A coagulate-free stable dispersion is obtained. When the dispersion is dried on glass plates, clear smooth films which have a very low tendency to absorb moisture and outstanding elasticity are obtained.

EXAMPLE 4

The following components are polymerized (quantities in parts):

|  | A | B | D | C | E |
|---|---|---|---|---|---|
| Water | 200 | 170 | 70 | 155 | 62.5 |
| A long chain alkyl sulphonate with approx. 12 to 20 carbon atoms | 3 | 3 | 2 | 3 | 2 |
| Polyurethane Dispersion I | — | 50 | 50 | 75 | 62.5 |
| Vinyl acetate | 100 | 80 | 30 | 70 | 25 |
| Sodium bicarbonate | 0.5 | 0.5 | 0.5 | 0.5 | 0.5 |
| Sodium pyrosulphite | 0.3 | 0.3 | 0.15 | 0.3 | 0.15 |
| Potassium persulphate | 0.3 |  | 0.2 | 0.3 | 0.2 |

About 20 percent of the monomer is added to the initial mixture and polymerization is initiated. The rest of the monomer is added dropwise over a period of from about 1 to about 2 hours. The reaction temperature is about 45°C. Polymerization is complete about 3 hours after the monomers have been added. Coagulate-free dispersions having a solids content of about 33 percent are obtained. While films of pure polyvinyl acetate are hard and brittle, the presence of 20 or 30 percent of Polyurethane I in the solid (tests B and C) produces a considerable increase in flexural strength and elasticity, and polyurethane contents of 40 percent or 50 percent (tests D and E) give soft non-tacky films of outstanding tensile strength which resemble leather in feel.

EXAMPLE 5

Vinyl acetate is polymerized in the following batches in the presence of Polyurethane Dispersion I and in the absence of an emulsifier (quantities in parts):

|  | A | B | C |
|---|---|---|---|
| Water | 120 | 105 | 90 |
| Polyurethane Dispersion I | 50 | 75 | 100 |
| Vinyl acetate | 80 | 70 | 60 |
| Cumene Hydroperoxide (70 percent solution) | 0.3 | 0.3 | 0.3 |
| Sodium formaldehyde sulphoxylate | 0.2 | 0.2 | 0.2 |

The reaction temperature is about 45°C. and the reaction time (after the monomers have been added) is about 4 hours. Stable coagulate-free dispersions are obtained which dry to form clear, smooth water-repellent films.

EXAMPLE 6

The following batches are polymerized in order to synthesize copolymer dispersions based on Polyurethane Dispersion I that crosslink spontaneously (quantities in parts):

|  | A | B |
|---|---|---|
| Water | 540 | 300 |
| Ethoxylated p-nonyl phenol (polymerization degree 30) | 10 | 10 |
| Polyurethane Dispersion I | 100 | 500 |
| Butyl acrylate | 280 | 152 |
| Acrylonitrile | 70 | 38 |
| Chloromethyl methacrylate | 6 | 6 |
| Methacrylic acid | 4 | 4 |
| Cumene hydroperoxide (70 % solution) | 0.5 | 0.5 |
| Sodium formaldehyde sulphoxylate | 0.3 | 0.3 |
| Polymerization temperature | 50°C. | 50°C. |

Polymerization is initiated following the addition of about 20 percent of the monomer mixture to a mixture of the water, emulsifier and polyurethane dispersion. The remaining 80 percent of the monomer mixture is added dropwise over a period of about 2 hours followed by stirring for about another 3 hours at about 50°C. Coagulate-free, mechanically highly stable emulsions, each of which has a solids content of about 40 percent are obtained. If samples of these emulsions are adjusted to a pH value of 7 or 9 and cast onto glass plates, clear elastic films are obtained from which no soluble components can be extracted at room temperature. After heating for about 15 minutes at about 100°C., the films are treated for about 24 hours with dimethyl formamide and trichlorethylene. The following values are noted for the increase in weight (in percent by weight, based on the dry weight of the films):

| Swelling in dimethyl formamide: | pH 7 | pH 9 |
|---|---|---|
| Test A | 280 | 265 |
| Test B | 235 | 170 |
| Swelling in trichlorethylene: |  |  |
| Test A | 520 | 330 |
| Test B | 110 | 180 |

EXAMPLE 7

About 500 parts of the 40 percent Polyurethane Dispersion I are diluted with about 690 ml of water, followed by the addition of about 60 parts of a monomer mixture of about 200 parts of butyl acrylate, about 40 parts of butadiene, about 40 parts of styrene, about 15 parts of N-(methacrylamidomethyl)-carbamic acid ethyl ester and about 5 parts of acrylamide. Solutions of about 1.5 parts of potassium persulphate in about 125 ml of water and about 0.5 part of sodium pyrosulphite in about 50 ml of water are run into the reaction mixture while stirring in a nitrogen atmosphere at about 50°C. After the reaction begins, the rest of the monomer mixture is added dropwise over a period of about 1 hour, followed by stirring for about another hour. A 30 percent polymer emulsion is obtained which, when dry, forms a clear coherent elastic film containing components that are still soluble. After the film has been heated for about 15 minutes at about 150°C., it is completely insoluble in toluene.

EXAMPLE 8

A polymer emulsion which can be fixed under alkaline conditions is prepared following the procedure described in Example 7 from a monomer mixture of about 260 parts of butyl acrylate, about 30 parts of acrylonitrile and about 10 parts of dichlorotriazinyl aminoethyl methacrylate.

EXAMPLE 9

About a 40 percent stable polymer emulsion is prepared following the procedure described in Example 7 from a monomer mixture of about 230 parts of ethyl acrylate, about 60 parts of 2-hydroxypropyl methacrylate and about 10 parts of acrylic acid.

EXAMPLE 10

About 12 parts of a monomer mixture of about 50 parts of butyl acrylate and about 10 parts of butane diol dimethacrylate are introduced into about 155 parts of Polyurethane Dispersion II, diluted with water to a solids content of about 25.8 percent, followed by the addition of about 0.3 part of potassium persulphate in about 25 ml of water and about 0.1 part of sodium pyrosulphite in about 10 ml of water while stirring in a nitrogen atmosphere at about 50°C. After the reaction has been initiated, the rest of the monomer mixture is added dropwise over a period of about 1 hour, followed by stirring for about another hour. Another about 0.3 part of potassium persulphate and about 0.1 part of sodium pyrosulphite are then added, followed by stirring for about 2 hours. When dried, the resulting 40 percent stable emulsion forms a clear hard coherent film.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of stable aqueous polymer dispersion which comprises polymerizing about 5 – 95 percent by weight based on the total amount of non-aqueous matter of olefinically unsaturated monomers under free radical emulsion polymerization conditions in the presence of about 95 – 5 percent by weight based on the total amount of non-aqueous matter of an anionic polyurethane prepared by reacting an organic polyisocyanate with an organic compound having at least two hydrogen atoms reactive with NCO groups, the anionic polyurethane having a tensile strength in excess of 20,000 kp/cm² and containing from about 0.1 to about 10 percent by weight of an anionic group selected from the group consisting of

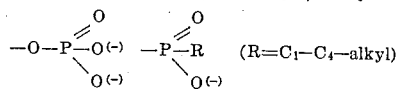

which radical is in the alkali metal salt form or in the form of an ammonium salt, which polyurethane is present in the form of a stable aqueous dispersion.

2. The process of claim 1 wherein the polyurethane is prepared by reacting an organic compound having at least two hydrogen atoms reactive with NCO groups and a molecular weight of from about 300 to about 20,000 with an organic polyisocyanate.

3. The process of claim 1 wherein the emulsion polymerization is carried out in the presence of an inorganic peroxide, an organic peroxide, an alkyl hydroperoxide, a dialkyl peroxide, a peroxy ester or mixtures thereof as catalysts.

4. The process of claim 3 wherein the catalyst is present in an amount of from about 0.01 to about 5 percent by weight based on the total weight of the monomer.

5. The process of claim 1 wherein the polymerization is carried out at a temperature of from about 0° to about 150°C.

6. The process of claim 1 wherein the reaction mixture contains a maximum of about 20 percent by weight of an emulsifier based on the total weight of the monomer component.

7. The process of claim 1 wherein from about 5 to about 95 percent by weight of anionic polyurethane is present to from about 95 to about 5 percent by weight of the monomer.

8. The process of claim 1 wherein the polyurethane dispersion has a solids content of from about 5 to about 60 percent by weight.

9. The process of claim 1 wherein at least about 20 percent of anionic polyurethane and a maximum of about 80 percent of polymerizable monomers are present in a reaction mixture which is free of emulsifiers.

10. The stable aqueous polymer dispersion prepared by the process of claim 1.

* * * * *